United States Patent [19]

Rehbein

[11] 4,171,841
[45] Oct. 23, 1979

[54] SUSPENSION CHAIN HEAD

[75] Inventor: Friedhelm Rehbein, Menden-Oesbern, Fed. Rep. of Germany

[73] Assignee: August Thiele, Iserlohn, Fed. Rep. of Germany

[21] Appl. No.: 913,080

[22] Filed: Jun. 6, 1978

[30] Foreign Application Priority Data

Jul. 8, 1977 [DE] Fed. Rep. of Germany ....... 2730838

[51] Int. Cl.² ............................................. B66C 1/12
[52] U.S. Cl. ...................................... 294/78 R; 59/93
[58] Field of Search ................ 59/86, 93, 78; 294/74, 294/78 R, 76, 78 A; 24/116, 241 SL

[56] References Cited

U.S. PATENT DOCUMENTS

| 1,689,170 | 10/1928 | Farmer | 294/78 R |
| 3,582,125 | 6/1971 | Collins | 294/74 |
| 3,974,641 | 8/1976 | Rieger | 59/93 |
| 4,060,269 | 11/1977 | Rieger | 294/74 |

FOREIGN PATENT DOCUMENTS

| 266238 | 2/1962 | Australia | 294/78 R |
| 1407149 | 9/1975 | United Kingdom | 59/86 |

*Primary Examiner*—Francis S. Husar
*Assistant Examiner*—Gene P. Crosby
*Attorney, Agent, or Firm*—Micahel J. Striker

[57] ABSTRACT

A suspension chain head for a mechanically assembled strand-oriented sling chain system has an annular suspension member for suspending the chain head, at least one forked member arranged for carrying an outlet member of the chain head, and a shackle which connects the forked member to the suspension member. The shackle has a first end portion by which it is hung to the suspension member, and a second end portion provided with a pin which connects the shackle to the forked member and is secured against nondestructive disengagement from the forked member. A locking pin is provided for securing the shackle pin to the forked member. The locking pin may be formed as a spring cotter engaged in a circular groove which is provided in the shackle.

9 Claims, 2 Drawing Figures

SUSPENSION CHAIN HEAD

BACKGROUND OF THE INVENTION

The present invention relates to a suspension chain head for a mechanically assembled strand-oriented sling chain system.

Suspension chain heads of the above-mentioned type have been known. Such a suspension chain head includes an annular suspension member for suspending the chain head which is undetachably connected with a connecting element shaped as a forked shackle or annular fork which, in turn, carries individual sling chains or connecting members. A transition or intermediate member may be provided, which member is welded to the suspension member and is connected with the above-mentioned connecting element. The sling chains or connecting members are correspondingly dimensionsed and have corresponding carrying capacity in predetermined range inasmuch as they serve for hanging or mounting loads thereto, or for suspending, shortening and/or connecting the chains thereto.

Different customers frequently make requirements that such strand-oriented or predetermined and unmistakenly arranged suspension chain heads be so formed as to from the first exclude eventual faulty mounting of sling chains or connecting members to the elements of the chain head.

These requirements are met by the known suspension members for one strand or two strand sling chains, which are so formed for receiving a predetermined number of sling chains or connecting members that the suspension element may be connected respectively with only one or more sling chains whose dimensions and carrying capacity are selected in a certain range. The known suspension members with the number of the chains connected thereto are increasingly expensive in manufacturing and have small sturdiness.

Suspension chain heads have been also known, including an annular suspension member which is welded with an annular transitional or intermediate member. A forked shackle or annular fork for connecting individual sling chains or connecting members of predetermined dimensions is welded to the transitional or intermediate member.

In such a suspension chain head a goal of mounting a predetermined limited number of sling chains is attained without difficulties encountered in the construction with three or more connecting elements or sling chains. In this case, on each forked shackle or annular fork only one sling chain or connecting member with certain dimensions and carrying capacity can be mounted. However, since all members of such a suspension chain head up to the forked shackles or annular forks must be welded to one another, the chain head must be manufactured for different applications and loading conditions in an extraordinarily great number of different constructions and dimensions, that particularly undesirably increases the storage expenditures.

SUMMARY OF THE INVENTION

Accordingly, it is an object of the present invention to provide a suspension chain head for a mechanically assembled strand-oriented sling chain system, which avoids the disadvantages of the prior art.

More particularly, it is an object of the present invention to provide a suspension chain head of the above-mentioned type which is so constructed that after delivery of prefabricated individual elements corresponding chains or connecting elements can be unmistakenly connected to a suspension member in accordance with a predetermined number of strands so as to provide correct carrying capacity. At the same time, the chain head provides for favorable manufacturing possibilities resulting from a certain limited number of prefabricated individual elements.

In keeping with these objects, and with others which will become apparent hereinafter, one feature of the present invention resides, briefly stated, in a suspension chain head for a mechanically assembled strand-oriented sling chain system having an annular suspension member for suspending the chain head, and at least one forked member arranged for carrying an outlet member of the chain head, wherein means for connecting the forked member to the suspension member includes a shackle which has a first end portion by which it is hung to the suspension member, and a second end portion provided with a pin which connects the shackle to the forked member and is secured against non-destructive disengagement from the latter.

The suspension chain head in accordance with the present invention has an advantage that the individual parts of the same are separately manufactured, heat-treated and, even if connected with the transitional member, are assembled only to an intermediate stage so as to be held in the thus-assembled condition in stocks. The final mounting of forked shackle or annular fork which serve as connecting elements, can be performed directly after delivery by means of shackles which are provided in the suspension head in accordance with the present invention.

This results in small storage expenditures with great delivery readiness.

In accordance with another feature of the present invention the connecting means for connecting the forked member to the suspension member includes a locking pin arranged for securing the pin of the shackle against non-destructive disangegement from the forked member. In a practical embodiment of the present invention, the locking pin is formed as a spring cotter.

Still another feature of the present invention is that the shackle is provided with a circular groove in which the spring cotter is engaged and sank. In such a construction, the assembled suspension chain head cannot be non-destructively dismounted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The drawings show a suspension chain head for a mechanically assembled four-strand chain system.

Figure 1:
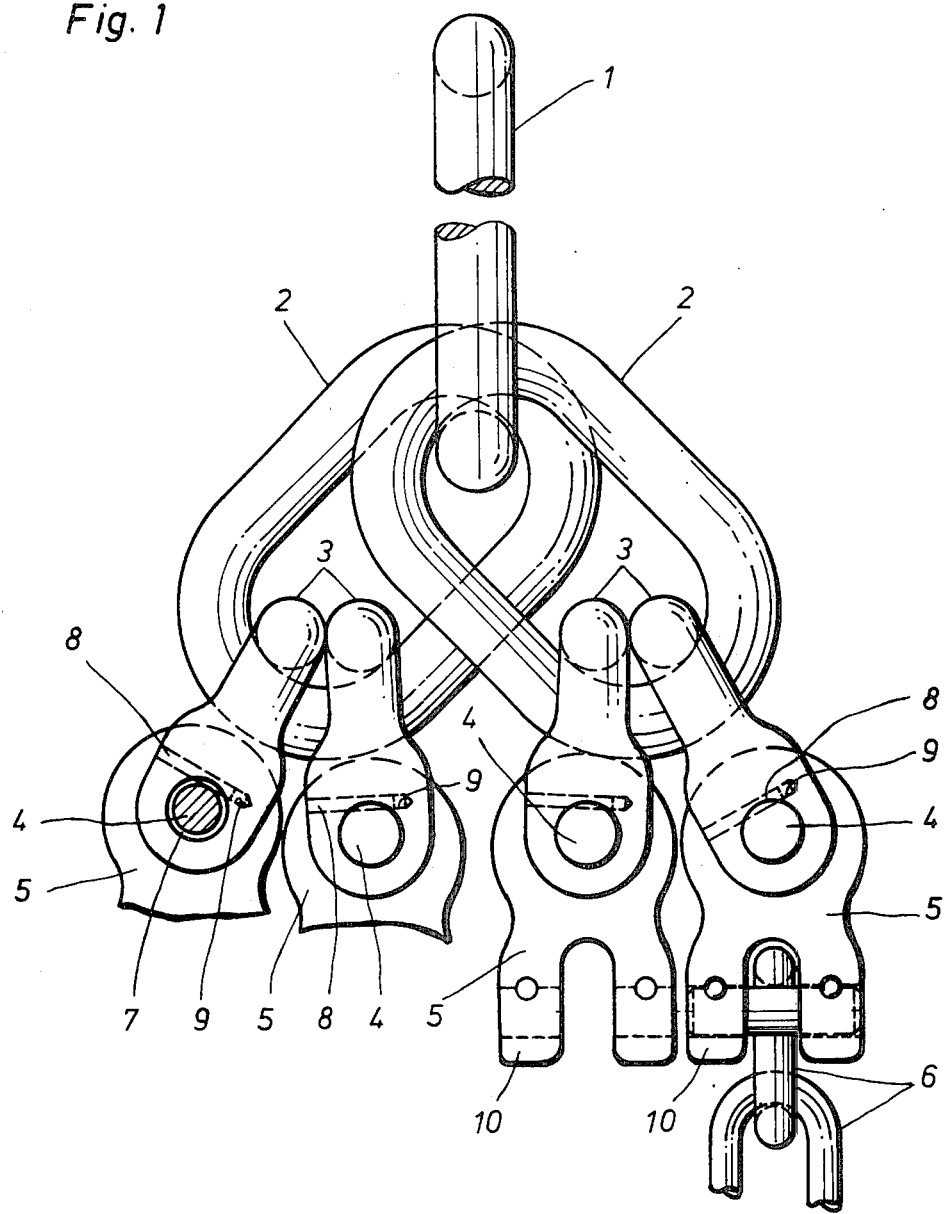
FIG. 1 is a partially sectioned side view of a suspension chain head for four-stranded sling chain system, in accordance with the present invention.

As particularly shown in FIG. 1, the suspension chain head has an annular suspension member 1, and two annular transitional or intermediate members 2 which are welded to the suspension member 1. Two shackles 3 are provided, each of which has a shackle pin 4 secured against non-destructive disengagement from a respective shackle. The shackles 3 are hung to the transitional or intermediate members 2. A forked shackle or annular fork 5 is hung on each of the shackles 3. The forked shackle or annular fork 5 serves for mounting a certain sling chain 6 or other connecting members and for this purpose is so dimensioned that its dimensions and carrying capacity are selected in predetermined range.

As can be seen from FIG. 1, the shackle pin 4 of each shackle 3 which hangs on the transitional or intermediate member 2 is inserted into a circular groove 7. In this position, the shackle pin 4 is secured against non-destructive disengagement by means of a locking pin 8 which is engaged in a blind hole 9 provided in the shackle 3. The locking pin 8 is so sank into the blind hole 9 so that after securing the shackle pin 4 the shackle 3 can be disengaged from the member 5 only by drilling. In other words, this disengagement cannot be performed without destroying or damaging the shackles. The locking pins 8 may be formed as spring cotters.

Figure 2:
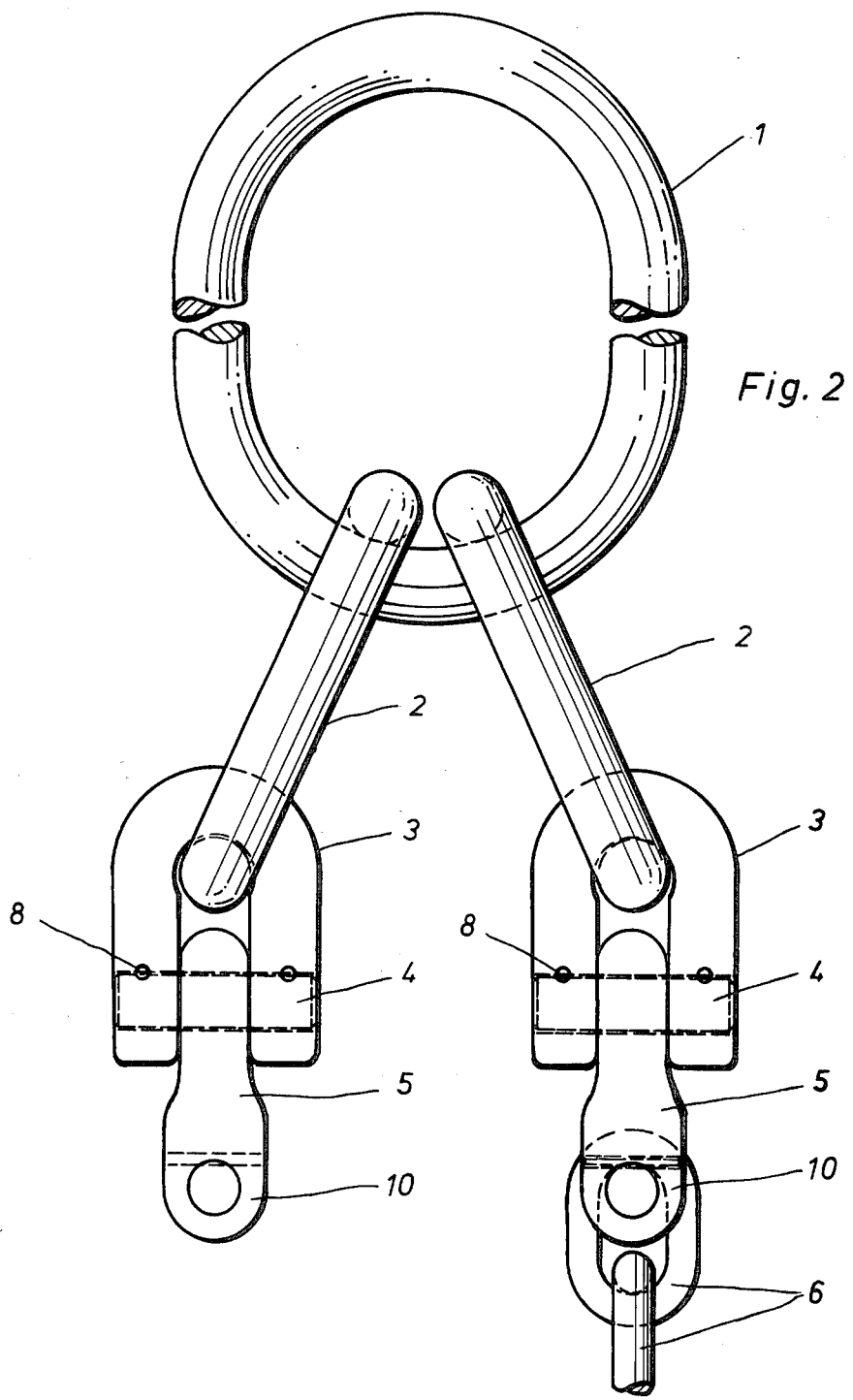
FIG. 2 is a front or rear view of the suspension chain head shown in FIG. 1, but turned by 90°.

As shown in FIG. 2, the suspension chain head in accordance with the present invention may not include the transitional or intermediate members 2. In this case, the shackles 3 are mounted directly on the suspension member 1 as shown in this figure for two strand sling chain system. It is also possible to connect reduction means or other suitable connecting elements directly to heads 10 of the forked shackles or annular forks 5, if needed. Without further elaboration it is believed to be clear from the above-presented description that the suspension chain head in accordance with the present invention can be easily brought to ready-to-use conditions by connecting the forked shackles or annular forks 5 to the suspension member by means of the shackles 3, either through the transitional or intermediate member 2 or directly to the suspension member 1. This can be done by a customer after delivery of corresponding parts of the suspension chain head. This means that the corresponding elements may be unmistakenly mounted on the forked shackles or annular forks 5 so as to form the suspension chain head with the carrying capacity corresponding to the required number of strands of two, three or more strand-oriented sling chain systems.

It will be understood that each of the elements described above, or two or more together, may also find a useful application in other types of constructions differing from the types described above.

While the invention has been illustrated and described as embodied in a suspension chain head for a mechanically assembled strand-oriented sling chain system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A suspension chain head for a mechanically assembled strand-oriented sling chain system, comprising an annular suspension member for suspending the chain head; two intermediate annular members each having a first end section welded to said annular suspension member so that both said intermediate annular members hang to the latter, and a second end section; at least two forked members each arranged for carrying an outlet member of the chain head; and means for undetachably connecting said forked members to said suspension member and including a pair of shackles each having a first end portion by which it is hung to the second end section of a respective one of said intermediate annular members, and a second end portion provided with a pin which connects each shackle to a respective one of said forked members and is secured against non-destructive disengagement from said shackle.

2. The chain head as defined in claim 1, and further comprising two further such forked members each also arranged for carrying a further outlet member of the chain head and together with said first-mentioned two forked members forming a four-strand sling chain system, said connecting means being arranged for undetachably connecting to each of said intermediate annular members simultaneously two of said forked members, and further including two further such shackles to provide pairs of shackles connecting to each said intermediate annular member, one pair of shackles connecting one first-mentioned and one further forked member to one of said intermediate annular members, and the other pair of shackles connecting the other first-mentioned and the other further forked member to the other intermediate annular member.

3. The chain head as defined in claim 1, wherein each of said forked members is a forked shackle.

4. The chain head as defined in claim 1, wherein each of said forked members is an annular fork.

5. The chain head as defined in claim 1, wherein said means includes a locking pin arranged for securing said pin of each of said shackles against non-destructive disengagement from said shackle.

6. The chain head as defined in claim 5, wherein each of said shackles has a blind hole in which said locking pin is inserted.

7. The chain head as defined in claim 6, wherein said locking pin and said blind hole are so dimensioned that the former sinks into the latter.

8. The chain head as defined in claim 5, wherein said locking pin is formed as a spring cotter.

9. The chain head as defined in claim 8, wherein said pin is provided with a circular groove in which said spring cotter is engaged.

* * * * *

UNITED STATES PATENT AND TRADEMARK OFFICE
CERTIFICATE OF CORRECTION

PATENT NO. : 4,171,841
DATED : October 23, 1979
INVENTOR(S) : Friedhelm Rehbein

It is certified that error appears in the above—identified patent and that said Letters Patent is hereby corrected as shown below:

On the title page,
[73] The name of the Assignee should read

-- Firma August Thiele --

Signed and Sealed this

Eleventh Day of January 1983

[SEAL]

Attest:

Attesting Officer

GERALD J. MOSSINGHOFF
Commissioner of Patents and Trademarks